Patented Feb. 24, 1925.

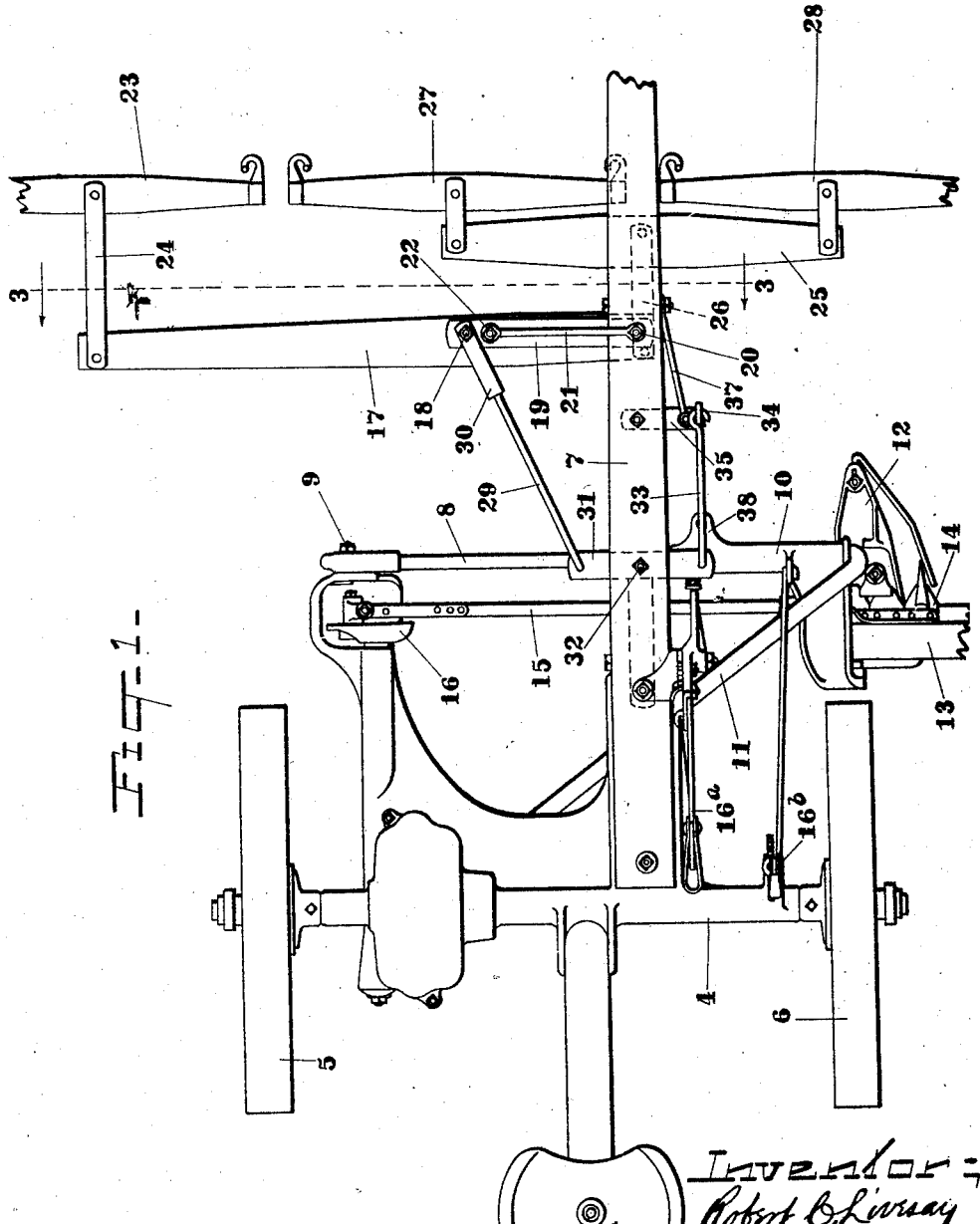

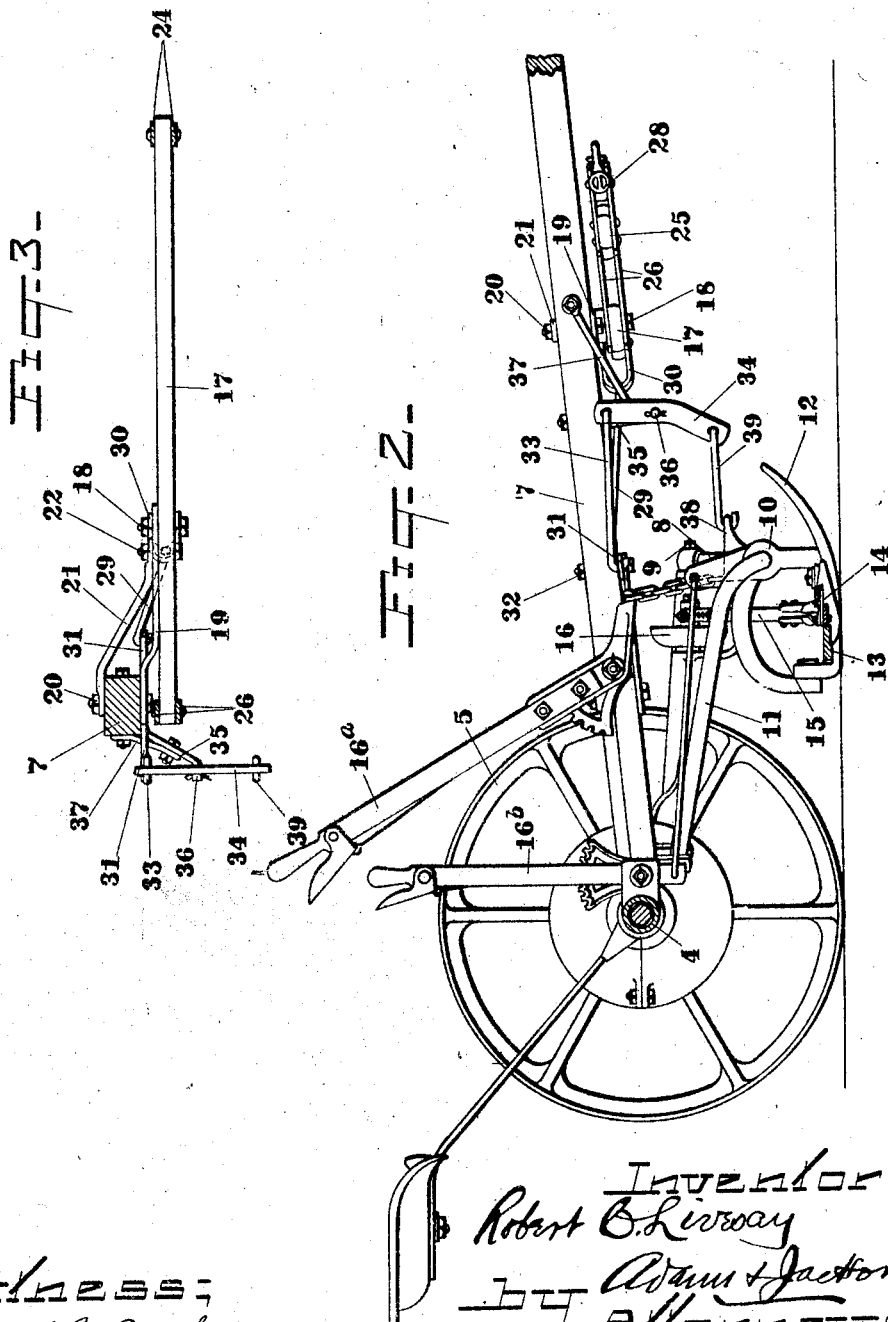

1,527,567

UNITED STATES PATENT OFFICE.

ROBERT C. LIVESAY, OF MOLINE, ILLINOIS, ASSIGNOR TO DEERE & COMPANY, OF MOLINE, ILLINOIS, A CORPORATION OF ILLINOIS.

DRAFT DEVICE FOR MOWERS.

Application filed October 23, 1919. Serial No. 332,766.

*To all whom it may concern:*

Be it known that I, ROBERT C. LIVESAY, a citizen of the United States, and a resident of Moline, in the county of Rock Island and State of Illinois, have invented certain new and useful Improvements in Draft Devices for Mowers, of which the following is a specification, reference being had to the accompanying drawings.

My invention relates to harvesting machinery, such as mowers, and has particularly to do with the construction and arrangement of the draft devices by which the draft animals are connected with the implement. My principal object is to provide an improved three-horse evener constructed so that the horses will travel over the stubble and the draft will be uniformly distributed between them, and will be applied partly to the main frame of the mower and partly to the coupling frame thereof, the draft applied to the coupling frame serving to float the finger bar so that the implement will travel easily. I accomplish my object as illustrated in the accompanying drawings and as hereinafter described. What I regard as new will be set forth in the claims.

In the accompanying drawings,—

Fig. 1 is a plan view of the principal parts of a mower embodying my improvements, part of the finger bar being omitted;

Fig. 2 is a side elevation thereof, some parts being in section; and

Fig. 3 is a detail, being a partial vertical cross section on line 3—3 of Fig. 1.

Referring to the drawings,—4 indicates the main frame of the mower which is provided with the usual wheels 5—6 and tongue 7. The construction of the operating parts of the mower proper may be of any approved design, such, for example, as that shown in Letters Patent No. 1,147,708, granted to Joseph Dain July 27, 1915, and it will be understood, therefore, that my improvements may be applied to mowers of any suitable construction. 8 indicates the usual drag bar which extends transversely of the main frame at the front thereof, and is pivotally connected therewith at one end by a pivot 9. The opposite end of the drag bar 8 is connected with a shoe bracket 10 which is pivotally mounted thereon so as to rock about a transverse axis, said bracket being also pivotally connected with a diagonally-disposed thrust bar 11, the rear end of which is pivotally connected with the main frame 4 in the usual way, as illustrated, for example, in said Dain patent. The drag bar 8, shoe bracket 10 and thrust bar 11 constitute the coupling frame. 12 indicates the usual inner shoe which is connected with the shoe bracket 10 so as to swing therewith about a transverse axis, and is also adapted to swing independently thereof about a longitudinal axis, as usual. 13 indicates the usual finger bar which is connected with the shoe 12, and 14 indicates the usual cutter bar which is mounted on the finger bar 13 and is reciprocated by a pitman 15 driven by the usual crank disc 16. Hand levers 16ᵃ and 16ᵇ, connected in any usual manner to the coupling frame, are shown and are adapted respectively for raising and lowering the coupling frame and rocking the shoe bracket.

Coming now to the draft devices, 17 indicates a transversely-disposed draft bar which is pivotally mounted between its ends on a pivot 18 which is carried by a horizontally-swinging bar 19, the inner end of which is pivotally connected with the tongue by a pivot 20, best shown in Fig. 3. In the construction illustrated, the bar 19 extends under the tongue, and is braced by means of a strap 21 connected at its inner end with the pivot 20, and at its outer end connected with the bar 19 by a bolt or rivet 22, as shown in Figs. 1 and 3. The strap 21 and bar 19, therefore, form a longitudinally swinging support upon which the draft bar 17 is pivotally mounted. 23 indicates a single-tree at the outer end of the draft bar 17 and connected therewith in any suitable way, as by a strap 24, shown in Fig. 1. 25 indicates a whiffle-tree which is connected with the inner end of the draft bar 17 by a yoke or clevis 26. Said whiffle-tree carries single-trees 27—28 connected with its ends in the usual way and arranged substantially in alinement with the single-tree 23, as shown in Fig. 1.

29 indicates a connecting rod, the forward end of which is connected with the intermediate portion of the draft bar 17 in such manner that the draft power applied to said draft bar will exert a forward pull on said rod. This is best accomplished by connecting the rod 29 with the pivot 18 on which said draft bar is mounted, and preferably a coupling 30 is employed for this purpose.

Any other suitable arrangement by which the draft is applied to the rod 29 may, however, be employed. The rear end of said rod is connected with one end of an equalizer bar 31 which is connected with the tongue by means of a pivot 32. The opposite end of said equalizer bar 31 is connected by a link 33 with the upper end of a distributor bar in the form of a vertically-disposed lever 34 fulcrumed upon a depending bracket 35 by means of a pivot 36, shown in Fig. 2. The bracket 35 is rigidly secured to the tongue 7 in any suitable way, and is braced by a brace rod 37 connected with the tongue, as shown in Figs. 1 and 2. The lower end of the lever 34 is connected with an ear 38 carried by the shoe bracket 10 by means of a connecting rod 39, as shown in Fig. 2.

From the foregoing description it will be apparent that the draft applied to the single-trees will be equalized and transmitted to the pivot 18 with which the forward end of the rod 29 is connected, thereby exerting a forward pull upon the outer end of the equalizer bar 31, since the pivot 18 is carried by the supporting bar 19 and is capable of movement forward and backwards, owing to the pivotal mounting of said supporting bar. The equalizer bar 31 being pivotally connected with the tongue by the pivot 32, and at its opposite end being connected with the coupling frame of the mower by means of the links 33—39 and lever 34, it will be seen that part of the draft will be transmitted to the main frame through the tongue and part of it will be transmitted to the shoe bracket 10, and therefore to the coupling frame, by means of the lever 34. The draft bar 17 is made long enough so that the third horse is provided for without altering the position which the whiffle-tree would normally occupy if two horses only were used.

What I claim as my invention and desire to secure by Letters Patent, is—

1. The combination with a mower, comprising a main frame, a coupling frame, a tongue connected with the main frame, and a finger bar connected with the coupling frame, of an evener comprising a transversely-disposed draft bar movable longitudinally of the machine, means connected with the tongue and pivotally supporting said draft bar between its ends at the opposite side of said tongue from said finger bar, a bar pivotally connected with the tongue, means connecting said bar at one side of the pivot thereof with the intermediate portion of said draft bar, and means connecting said bar at the other side of the pivot thereof with said coupling frame.

2. The combination with a mower, comprising a main frame, a coupling frame, a tongue connected with the main frame, and a finger bar connected with the coupling frame, of an evener comprising a transversely-disposed draft bar movable longitudinally of the machine, swinging means connected with the tongue and pivotally supporting said draft bar between its ends at the opposite side of said tongue from said finger bar, a bar pivotally connected with the tongue, means connecting said bar at one side of the pivot thereof with the intermediate portion of said draft bar, and a distributing bar connecting said bar at the other side of the pivot thereof with said coupling frame.

ROBERT C. LIVESAY.